United States Patent
Yahagi

(10) Patent No.: US 6,571,107 B1
(45) Date of Patent: May 27, 2003

(54) CONNECTION BETWEEN MOBILE STATIONS USING DIFFERENT SPEECH CODING RULES

(75) Inventor: Masahiko Yahagi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/376,361

(22) Filed: Aug. 18, 1999

(30) Foreign Application Priority Data

Aug. 18, 1998 (JP) ............................................. 10-231815

(51) Int. Cl.⁷ ................................................ H04B 1/38
(52) U.S. Cl. ....................................... 455/552; 375/220
(58) Field of Search ................................ 455/552, 553, 455/517, 445; 375/220, 260, 262, 264

(56) References Cited

U.S. PATENT DOCUMENTS

| | | | | |
|---|---|---|---|---|
| 5,742,640 A | * | 4/1998 | Haoui et al. ................. | 375/220 |
| 5,884,200 A | * | 3/1999 | Yamane et al. ............. | 455/575 |
| 5,987,327 A | * | 11/1999 | Lev et al. .................... | 370/328 |
| 5,991,642 A | * | 11/1999 | Watanabe et al. ........... | 455/560 |
| 6,108,560 A | * | 8/2000 | Navaro et al. .............. | 455/517 |
| 6,314,287 B1 | * | 11/2001 | Leickel et al. .............. | 455/426 |

FOREIGN PATENT DOCUMENTS

| | | |
|---|---|---|
| DE | 195 16 078 | 11/1996 |
| EP | 0 750 441 | 12/1996 |
| JP | 05-63833 | 3/1993 |
| JP | 06-6295 | 1/1994 |
| JP | 06-244933 | 9/1994 |

OTHER PUBLICATIONS

Masami Yabusaki et al: "Voice Communication Connection Control in Digital Public Land Mobile Networks" IEICE Transactions on Fundamentals of Electronics, Communications and Computer Sciences, JP, Insititute of Electronics Information and Comm. Eng. Tokyo, vol. E75–A, No. 12, Dec. 1992.

* cited by examiner

Primary Examiner—Nguyen T. Vo
Assistant Examiner—Nghi H. Ly
(74) Attorney, Agent, or Firm—Sughrue Mion, PLLC

(57) ABSTRACT

A mobile station connection method is disclosed for performing connection between mobile stations using different speech coding rules. When connecting a call between mobile stations which use different speech coding rules, an exchange determines a coding rule or rules to be used by the two mobile stations to be connected for the call. Each mobile station selects from among a plurality of coders and a plurality of decoders a coder and a decoder to be used in accordance with instructions from the exchange. Speech information can thus be transmitted directly between the two mobile stations because coding/decoding are performed in accordance with the coding rule or rules instructed by the exchange regardless of radio systems of the area in which the mobile stations are present.

6 Claims, 6 Drawing Sheets

CONNECTION BETWEEN MOBILE STATIONS USING DIFFERENT SPEECH CODING RULES

BACKGROUND OF THE INVENTION

1. Field of the Invention

This invention relates to a mobile communication system, and more particularly to a mobile station connection method of controlling connection of a telecommunication channel established between a mobile station and a radio base station.

2. Description of the Related Art

In a conventional mobile communication system, when a call is established between a mobile station and a fixed station, speech information transmitted from the mobile station to a radio base station is coded in accordance with the speech coding rule of the radio system of the area in which the mobile station is present. Therefore, the speech information from the mobile station is transmitted to the fixed station after it is converted in accordance with a speech coding rule (for example, 64 kbps PCM (Pulse Code Modulation)) for the fixed station.

Next, connection of a call between two mobile stations will be described. There are various radio systems for establishing channel connecting mobile stations and base stations and as the coding rules suitable for a radio system to code speech information can be selected, there are also various kinds of coding rules.

If the coding rules used by two mobile stations when connecting a call are the same, coded speech information can be transmitted directly to destination mobile station, but if different coding rules are used by two mobile stations when connecting a call, coded speech information cannot be transmitted directly to the destination mobile station.

A method of connecting a call between mobile stations using different coding rules is illustrated in FIG. 1.

FIG. 1 is a view illustrating connection of a call between mobile station 71 and mobile station 72. Mobile station 71 is connected to radio base station 81 by a radio link according to radio system 1 and uses coding rule 1 as a coding rule. Mobile station 72 is connected to radio base station 82 by a radio link according to radio system 2 and uses coding rule 2 as a coding rule.

Mobile station 71 comprises a coder 11 for coding rule 1 and a decoder 12 for coding rule 1. Coder 11 for coding rule 1 codes transmission data in accordance with coding rule 1, and decoder 12 for coding rule 1 decodes received data coded in accordance with coding rule 1.

Mobile station 72 comprises a coder 21 for coding rule 2 and a decoder 22 for coding rule 2. Coder 21 for coding rule 2 codes transmission data in accordance with coding rule 2, and decoder 22 for coding rule 2 decodes received data coded in accordance with coding rule 2.

Radio systems such as TDMA and CDMA systems are available for radio systems 1, 2. As a TDMA system, radio systems such as IS-54, RCR-27 systems are available, and as a CDMA system, radio systems such as IS-95, W-CDMA systems are available.

As coding rules 1, 2, a coding rules such as CELP (Code Excited Linear Prediction) rule is used.

Coding rules are usually different in different radio systems, and in ordinary operation conditions, a mobile station uses a coding rule suitable for the radio system used in the area in which it is present.

For example, when the radio system used is the IS-95 system, a QCELP (Qualcom CELP) rule is used as a coding rule, but when the radio system is the PDC (Personal Digital Cellular) system used in Japan, the VSELP (Vector Sum Excited LPC) rule, whose transmission rate is 8 kbps (full rate), or the PSI (Pitch Synchronous Innovation)-CELP rule, whose transmission rate is 4 kbps (half rate), is used.

Thus, with a conventional mobile communication system, in order to connect a call between two mobile stations which use different coding rules, it is necessary for a radio base station to decode coded speech information from a mobile station of a transmission source into a PCM signal of 64 kbps and then to transmit the speech information to the radio base station of the area in which the transmission source mobile station is present through trunk equipment 90. Further, a radio base station of the area in which a transmission source mobile station is present must code, in order to transmit the speech information to the transmission destination mobile station, the speech information in accordance with a speech coding rule suitable for a radio system of the area in which the transmission destination mobile station is present.

However, in a case like the one described, when speech information is transferred from the transmission source mobile station to the destination mobile station, coding-decoding is repeated twice as coding-decoding-coding-decoding. This caused the problems that coding/decoding delay doubles and the band occupied in the trunk line is longer.

The conventional mobile communication system described above has suffered from the problem that coded speech information cannot be transmitted directly unless the two mobile stations employ the same speech coding rule.

SUMMARY OF THE INVENTION

It is an object of the present invention to provide a mobile communication system wherein coded speech information can be transmitted directly from a transmission source mobile station to a transmission destination mobile station of a even when the two mobile stations use different speech coding rules.

In order to attain the aforementioned object, in a mobile communication system according to the present invention, when a request for connection of a call is received, an exchange determines a coding rule or rules to be used by the two mobile stations to be connected. Mobile stations comprises a plurality of coders for coding speech information using different coding rules, a plurality of decoders for decoding coded information using different coding rules, and means for selecting a coder and a decoder to be used in accordance with instructions from an exchange.

According to the present invention, even when speech coding rules used by a transmission source mobile station and a transmission destination mobile station are different, coded speech information can be transmitted directly to the transmission destination mobile station, and consequently, coding/decoding delays can be reduced.

According to an embodiment of the present invention, the coder and the decoder to be used by the mobile station in accordance with the instruction from the exchange utilize the same coding rule.

According to another embodiment of the present invention, the coder and the decoder to be used by the mobile station in accordance with the instruction from the exchange can be selectively a coder and a decoder based on different coding rules.

The present invention allows a suitable speech coding rule to be selected taking into consideration the radio transmission capacity of the area, reducing the band occupied in a trunk line, because a speech coding rule can be designated independently of the radio system of the area in which a mobile station is present.

The above and other objects, features and advantages of the present invention will become apparent from the following description with reference to the accompanying drawings which illustrate examples of the present invention.

DETAILED DESCRIPTION OF THE PREFERRED EMBODIMENTS

Figure 1:
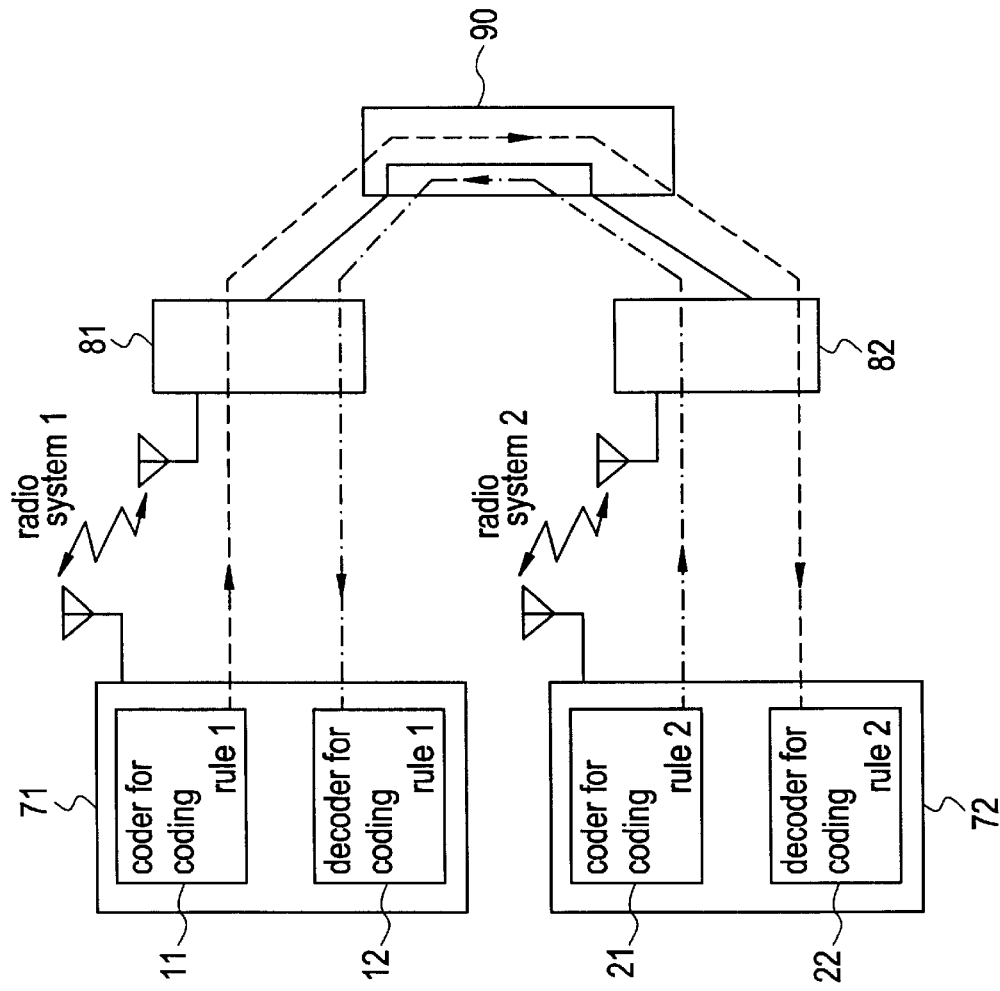
FIG. 1 is a diagrammatic view illustrating an operation of a conventional mobile communication system.
Figure 2:
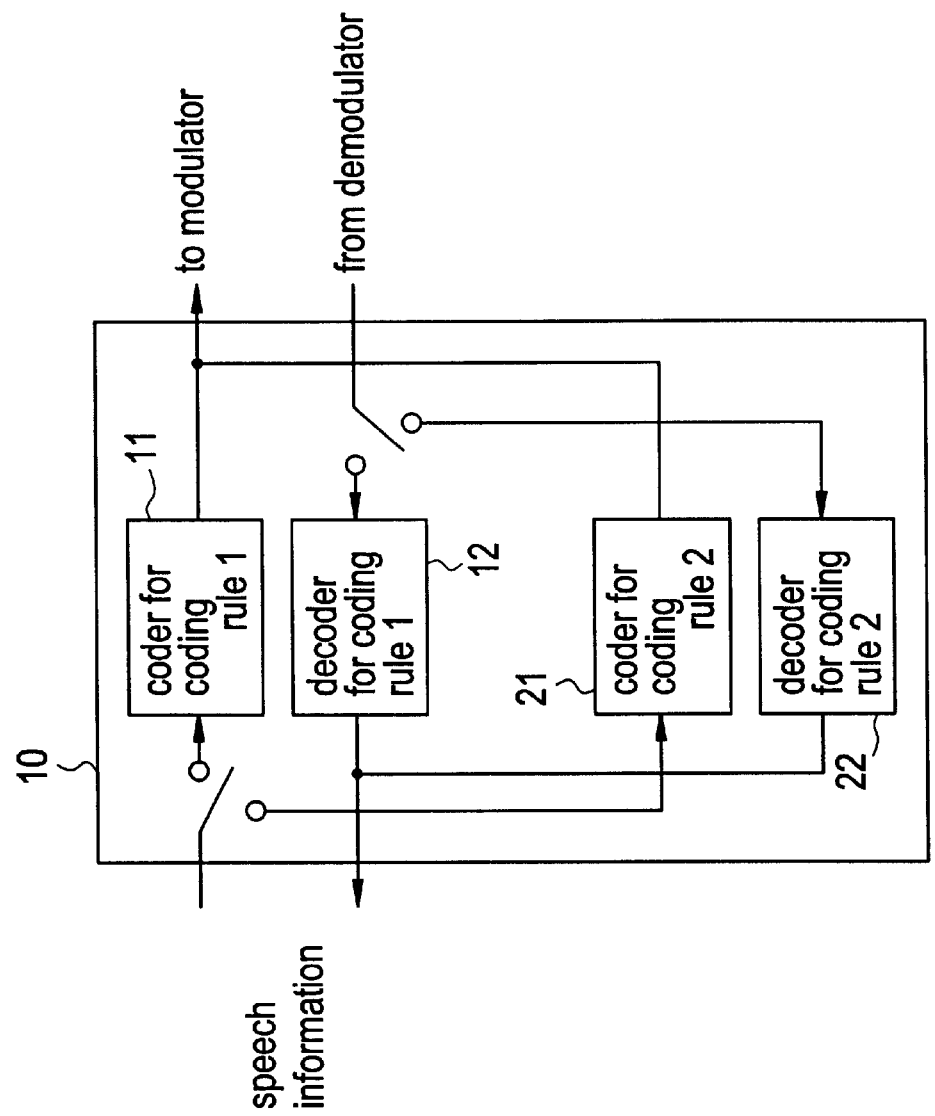
FIG. 2 is a block diagram showing a construction of coder/decoder switching circuit 10 of a mobile station in a mobile communication system according to an embodiment of the present invention.

Referring now to FIG. 2, a mobile station of a mobile communication system according to an embodiment of the present invention comprises a coder/decoder switching circuit 10 which includes coder 11 for coding rule 1 for coding speech information in accordance with coding rule 1, coder 21 for coding rule 2 for coding the speech information in accordance with coding rule 2, decoder 12 for coding rule 1 for decoding a signal demodulated by a demodulator in accordance with coding rule 1, and decoder 22 for coding rule 2 for decoding the signal demodulated by the demodulator in accordance with coding rule 2.

In the mobile station, switching between coder 11 for coding rule 1 and coder 21 for coding rule 2 and switching between decoder 12 for coding rule 1 and decoder 22 for coding rule 2 are performed by coder/decoder switching circuit 10 based on control information received from an exchange.

Next, operation of the mobile communication system of the present embodiment will be described with reference to FIGS. 3 and 4.

Figure 3:
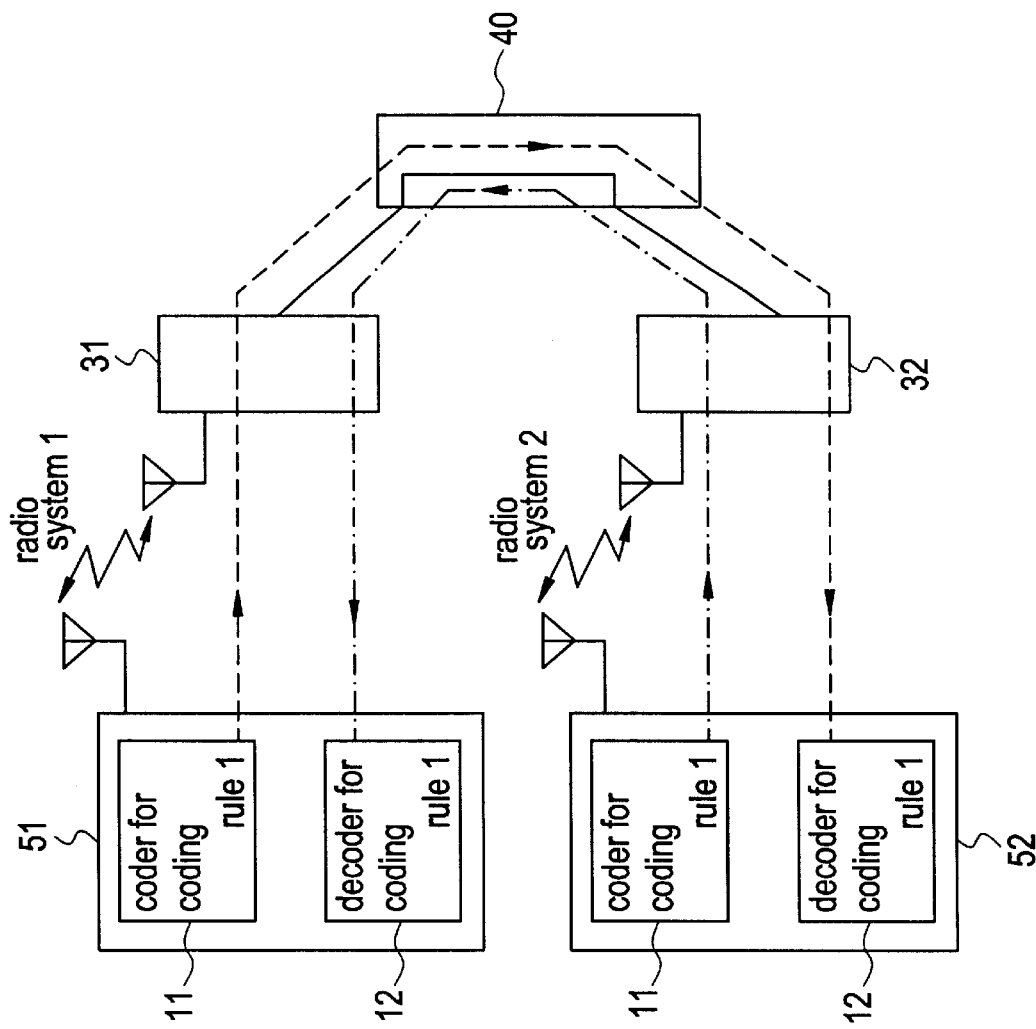
FIG. 3 is a diagrammatic view illustrating an operation of the mobile communication system of the embodiment.
Figure 4:
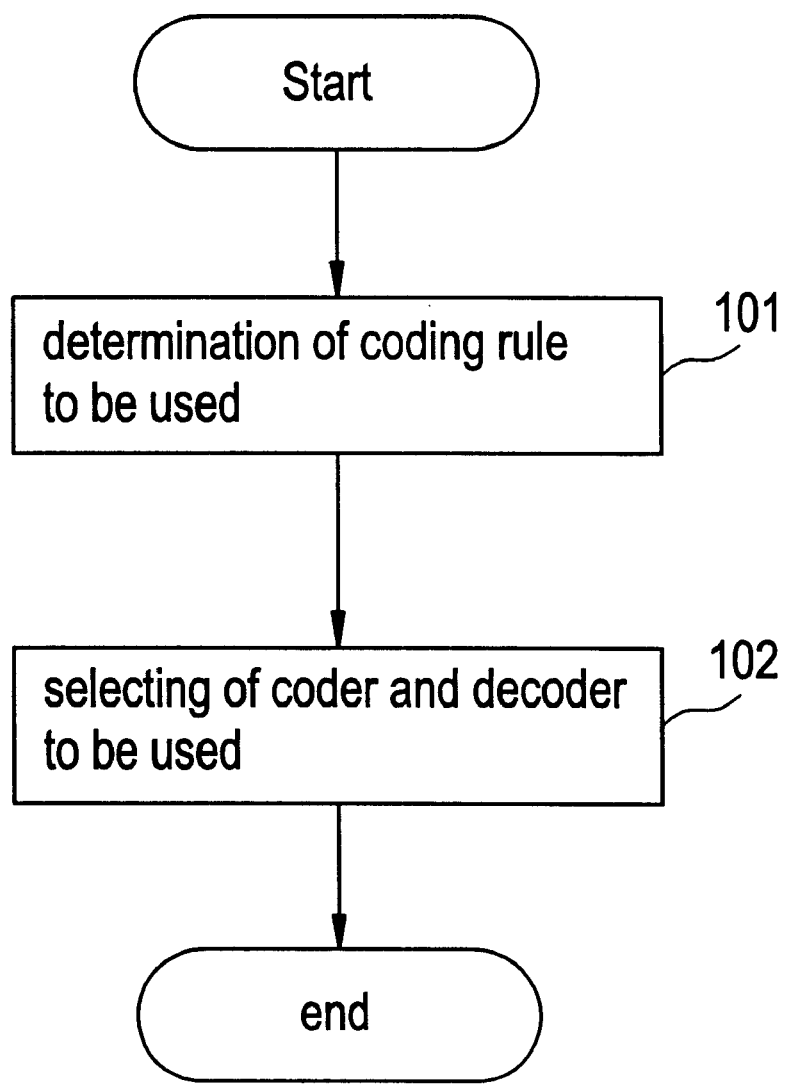
FIG. 4 is a flow chart illustrating a mobile station connection method of the embodiment.

FIG. 3 illustrates the mobile communication system when mobile station 51 is present in the area of radio system 1 and mobile station 52 is present in the area of radio system 2. FIG. 4 is a flow chart illustrating a mobile station connection method in the present embodiment.

In the condition illustrated in FIG. 3, mobile station 52 normally uses coding rule 2 because radio system 2 is used as its radio system. However, when connecting a call between mobile stations 51, 52, control information indicating the use of coding rule 1 is transmitted from the exchange to mobile station 52 at step 101. Consequently, at step 102, mobile station 52 performs switching from coder 21 for coding rule 2 to coder 11 for coding rule 1 and performs switching from decoder 22 for coding rule 2 to decoder 12 for coding rule 1.

Therefore, although mobile station 52 is present in the area of radio system 2, it uses coding rule 1, which is used in the area of radio system 1 to effect coding/decoding, and speech information coded in accordance with coding rule 1 is transmitted directly between mobile station 51 and mobile station 52.

Figure 5:
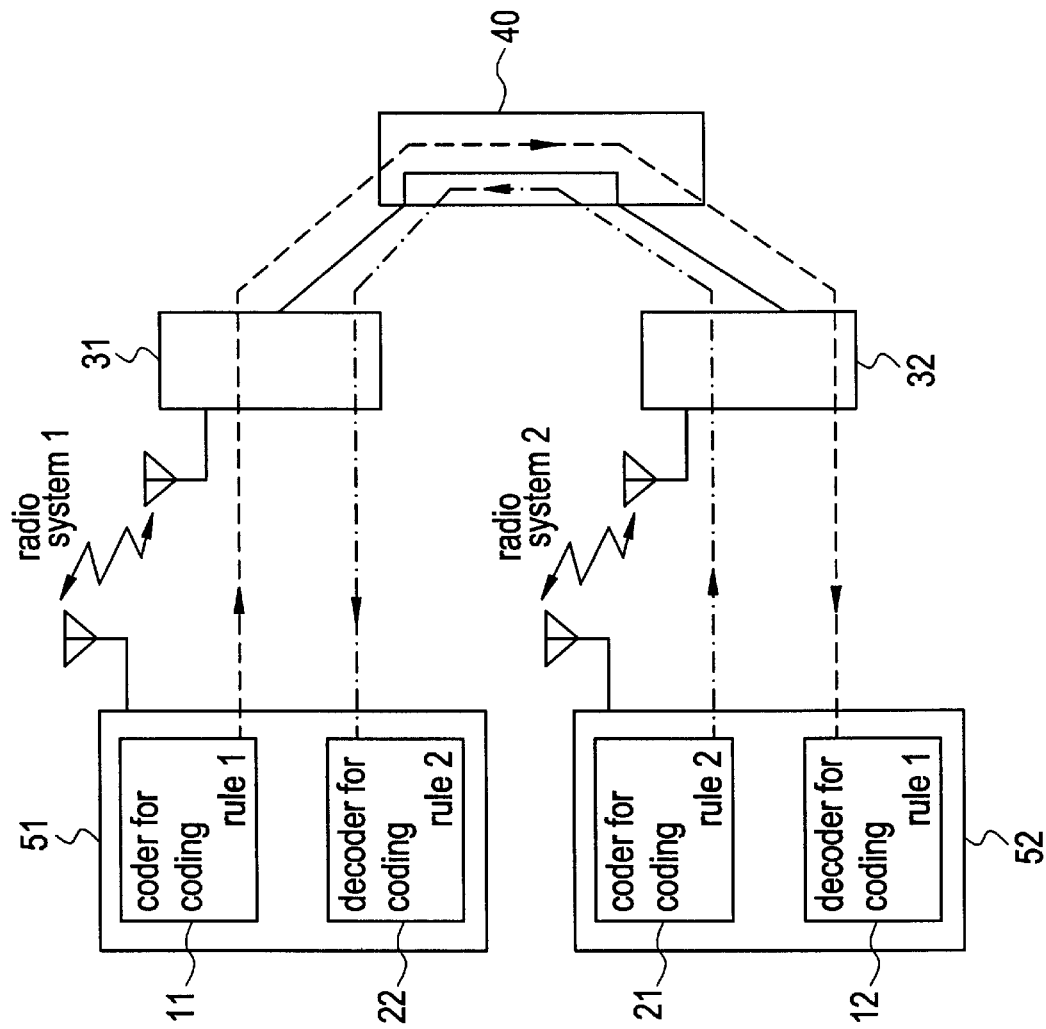
FIG. 5 is a diagrammatic view illustrating another operation of the mobile communication system of the embodiment.

Since the mobile station of the mobile communication system according to the present embodiment is capable of setting up different coding rules when coding and decoding, it can perform the operation illustrated in FIG. 5. In FIG. 5, speech information transmitted from mobile station 51 to mobile station 52 is coded in accordance with coding rule 1, while speech information transmitted from mobile station 52 to mobile station 51 is coded in accordance with coding rule 2.

Figure 6:
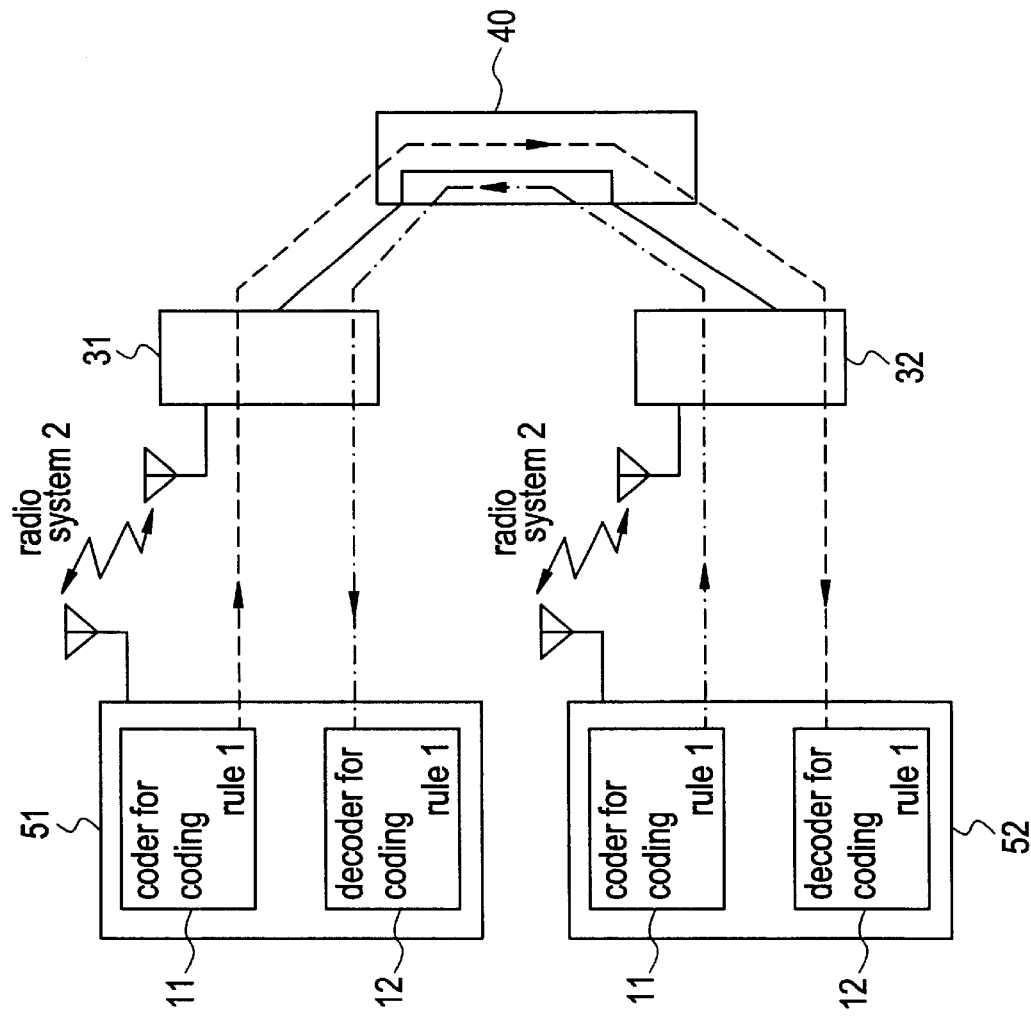
FIG. 6 is a diagrammatic view illustrating another operation of the mobile communication system of the embodiment.

In addition, since the mobile station of the mobile communication system of the present embodiment allows a transmission source and/or transmission destination mobile station to use speech coding rules unrelated to the radio systems of the areas in which the mobile stations are present, it can perform the operation illustrated in FIG. 6. In FIG. 6, although mobile stations 51, 52 are present in the area of radio system 2, both mobile stations 51, 52 use coder 11 for coding rule 1, and decoder 12 for coding rule 1 to communicate speech information.

The reason why a coding rule different from a coding rule which originally depended upon a radio system is used is that this increases the transmission capacity of a trunk line or improves the speech quality rather than to increase the transmission capacity of a radio area.

The present embodiment has been described above in connection with the case wherein two coding rules are used as the coding rules. However, the present invention is not limited to this and can be applied similarly also when three or more coding rules are used.

While a preferred embodiment of the present invention has been described using specific terms, such description is for illustrative purposes only, and it is to be understood that changes and variations may be made without departing from the spirit or scope of the following claims.

What is claimed is:

1. A mobile communication system for connecting among a plurality of mobile stations each using a different radio system, said system comprising:

an exchange for determining, when a request for connection of a call is received and when connecting a plurality of mobile stations employing different radio systems, a coding rule or rules different from a coding rule that depends upon the radio system as a coding rule or rules to be used by the plurality of mobile stations to be connected for the call; and a mobile station having a plurality of coders for coding speech information using different coding rules, a plurality of decoders for decoding coded information using different coding rules, and means for selecting one of said coders and one of said decoders to be used in accordance with instructions from said exchange.

2. A mobile communication system according to claim 1, wherein the coder and the decoder to be used by said mobile station in accordance with instructions from said exchange are based on the same coding rule.

3. A mobile communication system according to claim 1, wherein the coder and the decoder to be used by said mobile station in accordance with instructions from said exchange can be selectively one of said coders and one of said decoders based on different coding rules.

4. A mobile station connection method for connecting among a plurality of mobile stations each using a different radio system, said method comprising the steps of:

determining by an exchange a coding rule or rules different from the coding rule that depends upon the radio system as the coding rules to be used by a plurality of mobile stations in making a connection when a request for a call is generated and when connecting a plurality of mobile stations employing different radio systems; and selecting by a mobile station the coding rule to be used for coding speech information and the coding rule to be used for decoding coded information in accordance with instructions from said exchange.

5. A mobile station connection method according to claim 4, wherein the coding rule to be used for coding speech information and the coding rule to be used for decoding coded information in accordance with the instruction from said exchange by said mobile station are the same coding rule.

6. A mobile station connection method according to claim 4, wherein the coding rule to be used for coding speech information and the coding rule to be used for decoding coded information in accordance with the instruction from said exchange by said mobile station can be selectively different.

* * * * *